US012348492B2

(12) United States Patent
Baruah et al.

(10) Patent No.: US 12,348,492 B2
(45) Date of Patent: Jul. 1, 2025

(54) TRACKING DATA-PATH READINESS OF SECURITY SERVICES INSERTED IN MIDDLE MILE AND CLOUD GATEWAYS

(71) Applicant: Cisco Technology, Inc., San Jose, CA (US)

(72) Inventors: Pritam Baruah, Fremont, CA (US); Balaji Sundararajan, Fremont, CA (US); Nithin Bangalore Raju, San Jose, CA (US); Srilatha Tangirala, San Jose, CA (US); Ramakumara Kariyappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 18/128,824

(22) Filed: Mar. 30, 2023

(65) Prior Publication Data
US 2024/0333689 A1 Oct. 3, 2024

(51) Int. Cl.
*H04L 9/40* (2022.01)

(52) U.S. Cl.
CPC ...... *H04L 63/0281* (2013.01); *H04L 63/0236* (2013.01); *H04L 63/20* (2013.01)

(58) Field of Classification Search
CPC . H04L 41/0894; H04L 41/40; H04L 43/0817; H04L 43/0852; H04L 43/20; H04L 43/50; H04L 45/0377; H04L 63/02; H04L 63/0236; H04L 63/0281; H04L 63/14; H04L 63/16; H04L 63/20
See application file for complete search history.

(56) References Cited

U.S. PATENT DOCUMENTS

| 9,929,945 | B2 | 3/2018 | Schultz et al. |
| 11,375,005 | B1 | 6/2022 | Rolando et al. |
| 11,539,754 | B2 | 12/2022 | Pieczul et al. |
| 2010/0100960 | A1* | 4/2010 | Wu ............ H04L 45/586 726/22 |

(Continued)

FOREIGN PATENT DOCUMENTS

CN 107896195 B 4/2020

OTHER PUBLICATIONS

Search Report and Written Opinion for International Application No. PCT/US2024/021145, Dated Jun. 7, 2024, 13 pages.

*Primary Examiner* — Gil H. Lee
(74) *Attorney, Agent, or Firm* — Lee & Hayes, P.C.

(57) ABSTRACT

Techniques for utilizing a network gateway provisioned in a software-defined network to verify service readiness of one or more security service(s) of a service chain prior to redirecting network traffic along a given data-path to the security service(s). The gateway may be configured to open a specific port on a network device hosting a security service to transmit network policies and/or test network traffic to the security service. The network gateway may host a virtual source and/or a virtual destination and cause the virtual source to send test network traffic through the security service via the port and to the virtual destination. The gateway may then utilize the received test network traffic to determine whether a given security service satisfies a threshold health and/or functionality measurement. Once it is determined that the security service satisfies the thresholds, the gateway may cause network traffic to be redirected to the security service.

20 Claims, 8 Drawing Sheets

(56) References Cited

U.S. PATENT DOCUMENTS

| | | |
|---|---|---|
| 2015/0222656 A1* | 8/2015 | Haugsnes ............. H04L 63/104 |
| | | 726/23 |
| 2016/0060131 A1 | 3/2016 | Binhussain et al. |
| 2017/0141974 A1* | 5/2017 | Lahiri .................... H04L 43/12 |
| 2018/0077048 A1 | 3/2018 | Kubota et al. |
| 2018/0167285 A1* | 6/2018 | Constantinescu ....... H04L 43/50 |
| 2018/0176128 A1 | 6/2018 | Sharma et al. |
| 2021/0314277 A1 | 10/2021 | Rolando et al. |
| 2021/0351984 A1 | 11/2021 | DeBolle et al. |
| 2022/0006726 A1 | 1/2022 | Michael et al. |
| 2022/0326980 A1 | 10/2022 | Koponen et al. |

* cited by examiner

TRACKING DATA-PATH READINESS OF SECURITY SERVICES INSERTED IN MIDDLE MILE AND CLOUD GATEWAYS

TECHNICAL FIELD

The present disclosure relates generally to using network gateway(s) to track data path reachability through a service chain associated with cloud networks to ensure service readiness.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Additionally, in cloud-native environments, it is common to operationalize different services such that they execute in separate workloads and/or containers. While the availability of these services allows for increased security without additional computing needs of a user, there is a need to verify that such services are performing correctly and that the data path is working as desired.

For example, as traffic flows via software defined cloud interconnects (SDCI) and cloud gateway routers, towards cloud workloads and/or from branch to branch, customers need to ensure that security posture requirements of an enterprise are met. For this, security services like firewall, intrusion detection systems (IDS), intrusion prevention systems (IPS), etc., may need to be inserted as man-in-the-middle (MIM) in the path of the network. Since all the traffic from different branches and from cloud workloads is getting consolidated at colocation (colo) gateways, colo becomes a centralized location for applying consistent organizational policies, routing and filtering policies. This is achieved by stitching together a series of network functions (virtual network functions, aka services) into a chain (e.g., a service chain) and making it reachable from the gateway. These services may include virtual routers, FWs, IDS, IPS, load balancers, and/or the like. However, it may be desired to verify that a service that has been deployed is able to function properly and that the data path is working as desired.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
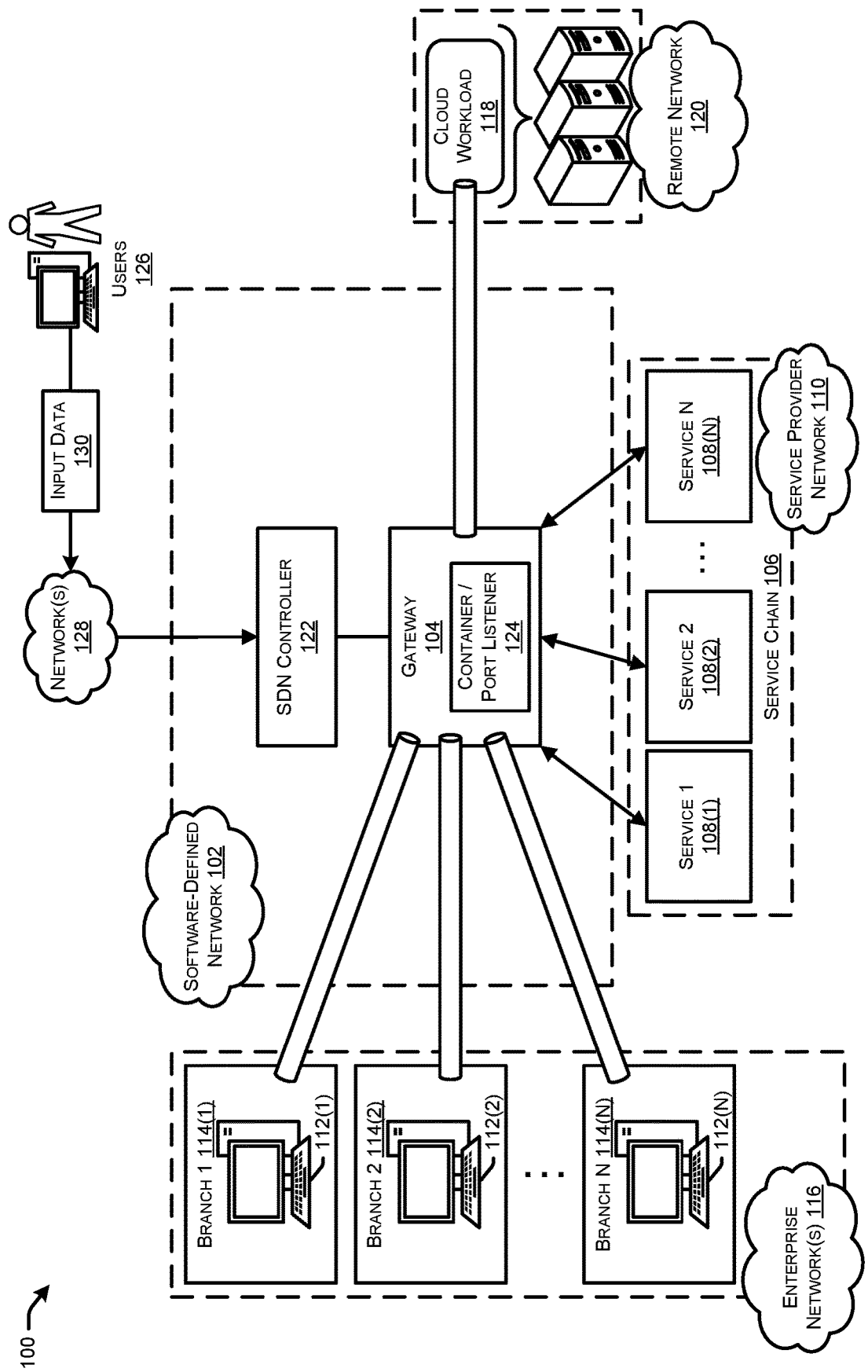
FIG. 1 illustrates a system-architecture diagram of an example environment for a network gateway configured to insert one or more security services of a service chain along a data-path between a source and a destination and verify that the security service(s) are functioning properly prior to redirecting network traffic to the security service(s).

This disclosure describes method(s) for using network gateway(s) to track data path reachability through a service chain associated with cloud networks to ensure service readiness. The method includes determining, by a network gateway associated with a network, a service chain including one or more security services associated with connecting a user device to a workload associated with the network. Additionally, or alternatively, the method includes provisioning, by the network gateway, a first security service of the service chain on a first network device along a data-path between the user device and the workload. Additionally, or alternatively, the method includes opening a first port on the first network device. In some examples, the first port may be configured to transmit test network traffic from a virtual source hosted on the network gateway through the first security service and to a virtual destination hosted on the network gateway. Additionally, or alternatively, the method includes sending, via the network gateway, the test network traffic from the virtual source to the virtual destination through the first security service via the first port associated with the first network device. Additionally, or alternatively, the method includes receiving, via the network gateway, the test network traffic at the virtual destination. Additionally, or alternatively, the method includes determining, by the network gateway and based at least in part on the receiving of the test network traffic at the virtual destination, that the first security service is healthy. Additionally, or alternatively, the method includes transmitting to one or more second network devices in the network, by the network gateway and based at least in part on determining that the first security service is healthy, configuration data associated with the first security service. In some examples, the configuration data may cause network traffic along the data-path between the user device and the workload to be redirected to the first network device associated with the first security service.

Additionally, the techniques described herein may be performed by a system and/or device having non-transitory computer-readable media storing computer-executable instructions that, when executed by one or more processors, performs the method described above.

Example Embodiments

This disclosure describes techniques for verifying service readiness in a service chain prior to steering data traffic toward the service chain. In some examples, a network gateway (e.g., a router, a colocation gateway, etc.) may be configured as a network service hub for a network. The network gateway (or network service hub) may be configured to identify security services associated with connecting a user device (e.g., located in a first branch of a network) to a workload (e.g., located in a second branch of the network, hosted in the cloud, etc.). In some examples, the network gateway may be configured to provision the security service(s) on network device(s) (e.g., network nodes, routers, etc.) along a data-path between the user device and the workload. The network gateway may then open a specified port on the network device(s) allowing for the insertion of policies and/or the transmission of test network traffic through the security service. For example, the network gateway may be configured to originate and/or terminate test network traffic and may send the test network traffic to the network device hosting the security service and receive the test network traffic back at the network gateway. By transmitting the test network traffic through the port of the network device, the network gateway may determine an indication of the functionality (e.g., is the service ready for traffic inspection, can network traffic pass through the security service from one side of the network to another, etc.) and/or the health (e.g., latency, response time, packet loss, etc.) of the security service(s). Based on the determined functionality and/or health of the security service, the network gateway may transmit configuration data to additional network devices in the network causing network traffic along the data-path between the user device and the workload to be redirected to the network device(s) hosting the security service(s). Additionally, or alternatively, the network gateway may be configured to verify the readiness of one or more security services configured as a service chain and may transmit configuration data causing network traffic along the data-path to be redirected to these service(s) as these security services are determined to meet a threshold for functionality and/or health. Additionally, or alternatively, the network gateway may be configured to transmit configuration data causing network traffic along the data-path to be redirected to additional service(s) if the prior services do not meet the threshold for functionality and/or health.

As previously described, a network gateway (e.g., configured as a network service hub) may be configured to verify that a service deployed has a default policy and that the data path is working as desired. That is, the network gateway may be configured to verify service readiness in a service chain prior to turning on data traffic toward the service chain. In some examples, deployment may involve (a) installing a security service (e.g., FW, IDS, IPS, etc.) as a MIM, (b) informing the network about its reachability, and then (c) pushing configurations across the network to steer traffic in the network towards the service. However, when a network admin is ready to execute step (c), the admin may be unaware if the security service itself has been programmed with any policy (e.g., default, enterprise-specific, and/or the like) or not. A policy programming step, step (x), may be introduced to the above-mentioned deployment process. For example, when a FW (or other security service) is deployed, there is no way of knowing whether the FW that is being inserted has the correct policy and/or if it has the ability to forward traffic from point A (e.g., a first branch) to point B (e.g., a second branch). That is, some may find out after deployment of the FW that the network (or a portion thereof) has been cut off. Step (x) may be configured to verify that the FW has the correct policy and that it is functioning properly before turning on the traffic flow through the network. In some examples, step (x) may happen any time before pushing configurations across the network (e.g., step (c)). Additionally, or alternatively, step (x) may not happen at all, in which case the admin would have to defer to step (c). In any case, the deployment orchestrator needs to know a viable boundary after which step (c) may take place. Described herein is a method to establish and recognize this boundary from the gateway. Additionally, often times users may have identified a FW that is unresponsive, and thus this tracking method to verify service chain reachability is very critical, and identification of the unresponsive FW would be detected prior to steering the network traffic toward the service.

In some examples, installing a security boundary rule (SBR) (e.g., performing step (x)) may comprise installing a U-turn rule at a security service and passing packet(s) through the U-turn rule in the service. For example, the SBR may be automatically installed in the policy of the security service on a specific port. In some examples, a customer may specify the port utilized to install the SBR. Additionally, or alternatively, a default port may be utilized to install the SBR. That is, the SBR may be precooked in the orchestrator and/or inputs may be taken to override defaults. The parameters include two loopback interfaces and their internet protocol (IP) addresses, ports as desired, IP protocol (e.g., default=transmission control protocol (TCP)), destination port, and/or condition=accept/deny. In examples where automatic installation of the SBR is not possible (e.g., because a security service does not provide an open application programming interface (API)) then the user may have to configure the SBR through the security service orchestration pane. Additionally, the user may be required to configure the network controller before probes can be triggered and step (c), pushing configurations across the network steering traffic toward the service, may take effect based on the outcome of probing. For example, the SBR may be configured such that probing may return action accept or deny.

The probe may be configured to mimic enterprise traffic and it will hit the security service. This not only tests the path between the gateway and the security service, but also the state of the security service, and most importantly, whether the security posture has been configured. When the probe passes, then the traffic policy rules will be pushed to the rest of the network, thus, ensuring fail-safe against traffic leaking without security service execution on it.

That is, when a service chain is deployed, user input may be received for a port number to enable a policy for the same to allow test injected traffic from a router (or gateway) on this specific port through the service being deployed. Additionally, or alternatively, a customer may also enable this port number allow via a third party orchestrator and may specify this port in a specific software-defined wide area network (SDWAN) orchestrator while bringing up the service chain.

Once the service comes up, a policy may be pushed to the service that will allow the port traffic to go from trust to un-trust and/or vice-versa. Monitoring tools may be leveraged from the router/gateway (e.g., configured as containers to initiate traffic) and/or or IP-service level agreement (SLA) tools to allow traffic to be originated and terminated on the router/gateway, such that the traffic may originated in a trust/un-trust zone, going to an un-trust/trust zone. This may be utilized to verify service readiness, in terms of CPU, packet latency, etc. via the service. Additionally, customers may enabled their own security service policies as per their organizational needs. Once the router/gateway (e.g., the service hub) determines that packet flow is healthy via the service (e.g., based on CPU, packet latency, etc. through the service) steps are taken to redirect traffic from a branch via remote policy or via co-located policies.

During traffic redirection, the service data path latency health may be constantly monitored and in the event that they exceed a configurable threshold value, the service may be declared as unhealthy (e.g., based on a few windows to ensure that the service is actually unhealthy) and withdraw the service for this site. Additionally, new flows may be directed to other sites and existing flows from branches may be pinned to this site to service the traffic. If the traffic probing returns a good health for the chain, the services may be restored. In short, the techniques described herein enable deployment of pre-determined service path verification for data traffic and ensures that if the data path is not responding correctly for liveliness for a few windows, and traffic may be pro-actively redirected to other sites capable of offering similar traffic capability.

Take, for example, a network (e.g., a software-defined network, a cloud computing network, a software-defined cloud interconnect, an enterprise network, etc.) comprising a network gateway. In some examples, a network controller may be employed to make various changes to the network gateway and/or to receive user input for configuring ports and/or protocols associated with various network devices in the network. In some examples, the network gateway may be configured as a colocation gateway, such that the network gateway may establish connections between one or more branches (e.g., of one or more enterprise network(s)) and/or one or more cloud workloads (e.g., of one or more remote network(s)). Given the colocation nature of the network gateway, network policies and/or configurations may be applied to the network via the network gateway. For example, based on one or more network policies, the network gateway and/or network controller may determine that network traffic traveling between (e.g., to and/or from) a first computing device residing in a first branch of a network and a second computing device residing in a second branch of the network is required to be processed by one or more security services, such as, for example, a service chain. In some examples, these security services may be executing on networking devices (e.g., routers, switches, nodes, etc.) provisioned along a data-path connecting the first computing device (e.g., the first branch) and the second computing device (e.g., the second branch). Additionally, or alternatively, the one or more security services may comprise at least one of a firewall, an intrusion detection system (IDS), an intrusion prevention system (IPS), a load-balancer, and/or the like. In some examples, the techniques described herein may be implemented on-premises (e.g., in an enterprise network) in hybrid networks, and/or the like, such that the network gateway and/or the service chain may be executing on-premises of a enterprise network and/or at a data center associated with the enterprise network and/or hybrid network.

As previously described, the network gateway may be at least partially programmable, such that a user (e.g., a network administrator, an enterprise user, a customer, etc.) may provide input specifying a port to open on a given network device hosting a given security service. Additionally, or alternatively, the network gateway may have a default policy indicating a default port to open on a given network device hosting a given security service. In some examples, the same port may be utilized for each network device hosting a security service included in a service chain. Additionally, or alternatively, a specific port may be utilized for each respective network device hosting a security service included in the service chain. With a port opened on the network device(s) hosting the security service(s), a security boundary rule may be provisioned in the respective security service(s). In some examples, a security boundary rule may indicate a source at which test network traffic may be sent from the network gateway and to the security service and/or a destination at which the test network traffic will be received at the network gateway and from the security service. That is, the security boundary rule may act as a U-turn with respect to the test network traffic.

The network gateway may comprise a security boundary rule probing application configured to transmit the test network traffic. In some examples, the network gateway may execute containers, virtual machines, and/or the like to host virtual source(s) and/or virtual destination(s). For example, the network gateway may be configured to execute a first container configured to host a virtual source on the network gateway and/or a second container configured to host a virtual destination on the network gateway. The network gateway may then utilize the first container hosting the virtual source to transmit the test network traffic to a network device hosting a security service via the open port, where the test network traffic may be sent through the security service and/or processed by the security service. Additionally, or alternatively, the network gateway may utilize the second container hosting the virtual destination to receive the test network traffic from the network device hosting the security service via the open port. When the test network traffic is received at the virtual destination, the network gateway may utilize the received network traffic to determine whether the security service meets a functionality threshold and/or a health threshold.

By receiving the test network traffic at the virtual destination, the network gateway may determine that the data-path is functioning correctly. In some examples, determining that the test network traffic was successfully sent from the virtual source, positioned on a first side of the security service along the data-path between the first computing device and the second computing device, to the network device hosting the security service, and received at the virtual destination, may indicate that the data-path is functioning correctly (e.g., the network is not cut off by the network device hosting the security service). In such an example, the network gateway may determine that the network device satisfies a threshold level of functionality. Additionally, or alternatively, the network gateway may make various determinations about the health of a security service based on one or more performance metrics, such as, for example, a response time associated with the security service, packet latency associated with the security service, central processing unit (CPU) metrics associated with the security service, and/or the like. For example, if the returned test network traffic indicates a slow response time, a high measure of packet latency, and/or CPU metrics indicative of high usage, the network gateway may determine that the security service does not satisfy the health threshold. Additionally, or alternatively, if the returned test network traffic indicates a moderate to fast response time, a moderate to low measure of packet latency, and/or CPU metrics indicative of moderate to low usage, the network gateway may determine that the security service does not satisfy the health threshold.

The network gateway may be further configured to utilize the indications of functionality and/or health associated with one or more security service(s) of a service chain to determine whether or not to redirect network traffic, along a data-path between the first computing device and the second computing device, to the security service. For example, the network gateway may determine that a given security service in the service chain satisfies a threshold level of functionality and/or health, and in response, the network gateway may transmit configuration data associated with the network device hosting the security service and/or the security service to additional network devices in the network. The configuration data may cause network traffic along the data-path between the first computing device and the second computing device to be redirected to the security service. In some examples, the network gateway may transmit configuration data for each individual security service included in the service chain. Additionally, or alternatively, the network gateway may transmit configuration data for all of the security service in the service chain.

The network gateway may also be configured to utilize the open port on a network device hosting a security service to test the functionality and/or health of the security service over time. For example, a security service may be unresponsive or otherwise indicate unexpected behavior. In such an example, the network gateway may attempt to send test network traffic from the virtual source through the security service and to the virtual destination to determine whether the security service is functioning properly and/or is healthy. In examples where the security service does not satisfy the threshold functionality and/or health, the network gateway may transmit configuration data to the additional network devices in the network causing network traffic along the data-path between the first computing device and the second computing device to be redirected to a different network device hosting the same security service (or a security service providing substantially similar operations). Additionally, or alternatively, at a later time, the network gateway may test the same security service again and determine that the security service satisfies the threshold functionality and/or health. In such an example, the network gateway may transmit configuration data to the additional network devices in the network causing the network traffic along the data-path between the first computing device and the second computing device to be once again redirected to the original network device hosting the original security service. That is, the network gateway may be configured to dynamically update the status of the network devices hosting the security services with respect to the other network devices, and cause network traffic to be redirected to the security services when the functionality and/or health satisfies the thresholds.

As described herein, a computing-based, cloud-based solution, network device, can generally include any type of resources implemented by virtualization techniques, such as containers, virtual machines, virtual storage, and so forth.

Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to deploying service chains by performing various operations on the security services prior to redirecting network traffic to the security services, increasing security and routing efficiencies in networks. For instance, the techniques described herein configure colocation network gateways as a network service hub to ensure that security services of a service chain are functioning properly. By configuring a colocation network gateway as a network service hub, where organization, routing, and/or filtering policies may already be applied, the network gateway may manage all of the services along data-paths between remote branches, cloud workloads, and/or the like. Additionally, the network gateway may execute a virtual resource, such as, for example, containers, configured to host virtual source(s) and/or virtual destination(s), where test network traffic may be transmitted through the security service to verify that the network is reachable through the security service. By sending the test network traffic through the security service, the functionality of the data-path along which the service is deployed can be determined, which is not possible by traditional techniques, such as simply pinging the security service. Further, by opening a user specified port on the network device(s) hosting the security service(s), policies may be easily pushed to the network devices, along with the test network traffic. Utilizing the port, the network may be configured to test security services that have been indicated as functioning improperly, confirm the improper functionality, and redirect traffic to another service that provides a substantially similar functionality. As such, network security may be increased by verifying that the security services are functioning properly and/or are healthy. In addition, network bandwidth and/or computing resources may be preserved by verifying service readiness of a security service prior to redirecting traffic to the service.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 of a software-defined network 102 (e.g., a cloud computing network, a software-defined cloud interconnect, an enterprise network, etc.) including a network gateway 104 that may configure a service chain 106 using one or more security services 108(1)-108(N) of one or more service provider network(s) 110 inserted along a data-path between user devices 112(1)-(N) associated with branches 114(1)-(N) of an enterprise network 116 and/or one or more cloud workload(s) 118 of one or more remote network(s) 120, where N may be any integer greater than 1. The network gateway 104 may also be configured to verify that the security service(s) 108 are functioning properly prior to redirecting network traffic to the security service(s) 108. The software-defined network 102 may comprise one or more data centers that include various networking components, such as, a Software-Defined-Networking (SDN) controller 122, one or more servers, one or more network switches, and/or one or more nodes. In some examples, the data center(s) may be located across geographic areas, and the software-defined network 102 may be a distributed network through which users (often customers) may interact via user devices to manage or otherwise interact with service provided by the software-defined network 102.

The software-defined network 102 may provide on-demand availability of computing system resources of physical server(s), such as data storage, computing power (e.g., CPU, GPU, etc.), networking, databases, etc., without direct active management by users. In some examples, the software-defined network 102 may be managed and maintained by a service provider such that users do not have to invest in and maintain the computing infrastructure for their computing resource needs. Generally, a user may be provided access to, or allocated use of, a portion of the computing resources of physical server(s) in the software-defined network 102. The software-defined network 102 may scale, such as by spinning up resources or spinning down resources, based on demand for the individual users. The portions of the software-defined network 102 may be allocated using hardware virtualization such that portions of the software-defined network 102 can be configured and managed by the user (e.g., network policies, security configuration, load balancing configuration, etc.). However, the software-defined network 102 need not be managed by a service provider, and can be managed by any entity, including the user themselves that run the applications or services.

In some examples, physical server(s) may host one or more virtual machines. Each virtual machine may be configured to execute one of various operations and act as one or more virtual components for the software-defined network 102, such as, for example, a container/port listener 124 executing on the network gateway 104. In some examples, the physical server(s) may host any number of virtual machines. In some examples, physical server(s) in the software-defined network 102 may host the network gateway 104, the SDN controller 122, and/or one or more additional network switching devices and/or nodes.

In some examples, a virtual machine may be configured to execute one of various operations and act as a container 124 hosting a virtual source and/or virtual destination and/or a port listener 124 configured to send and/or receive test network traffic and/or network policies to network devices hosting the security services 108. Additionally, or alternatively, a virtual machines may be configured to execute one of various operations and act as the network gateway 104 and/or the SDN controller 122.

In some examples, a number of users 126 may interact with the software-defined network 102 to apply network policies, change network configurations, and/or the like. The users 126 may comprise one or more of individual users, groups of users, organizations, businesses, or other entities that interact with the software-defined network 102 via respective user devices. The user devices may be any type of computing device capable of connecting to the software-defined network 102 via a suitable data communications network 128 such as, but not limited to, a laptop or desktop computer, a tablet computing device, a server computer, a television, or a mobile telephone. Administrative users employed by the operator of the software-defined network 102, such as administrators managing the operation of the software-defined network 102, might also connect with, manage, and utilize resources provided by the service provider network 102 in a similar fashion.

The users 126 may provide input data 130 via the network(s) 128 to interact with network gateway 104, such as, for example, to specify a port to open on a network device hosting a security service 108.

Take, for example, the software-defined network 102 (e.g., a software-defined cloud interconnect, an enterprise network, etc.) comprising the network gateway 104. In some examples, a network controller 122 may be employed to make various changes to the network gateway 104 and/or to receive input data 130 for configuring ports and/or protocols associated with various network devices in the software-defined network 102. In some examples, the network gateway 104 may be configured as a colocation gateway, such that the network gateway 104 may establish connections between one or more branches 114 (e.g., of one or more enterprise network(s) 116) and/or one or more cloud workloads 118 (e.g., of one or more remote network(s) 120). Given the colocation nature of the network gateway 104, network policies and/or configurations may be applied to the software-defined network 102 via the network gateway. For example, based on one or more network policies, the network gateway 104 and/or network controller 122 may determine that network traffic traveling between (e.g., to and/or from) a first computing device 112(1) residing in a first branch 114(1) of a network 116 and a second computing device 112(N) residing in a second branch 114(N) of the network 116 is required to be processed by one or more security services 108(1)-(N), such as, for example, a service chain 106. In some examples, these security services 108 may be executing on networking devices (e.g., routers, switches, nodes, etc.) provisioned along a data-path connecting the first computing device 112(1) (e.g., the first branch 114(1)) and the second computing device 112(N) (e.g., the second branch 114(N)). Additionally, or alternatively, the one or more security services 108 may comprise at least one of a firewall, an intrusion detection system (IDS), an intrusion prevention system (IPS), a load-balancer, and/or the like.

Figure 2A:
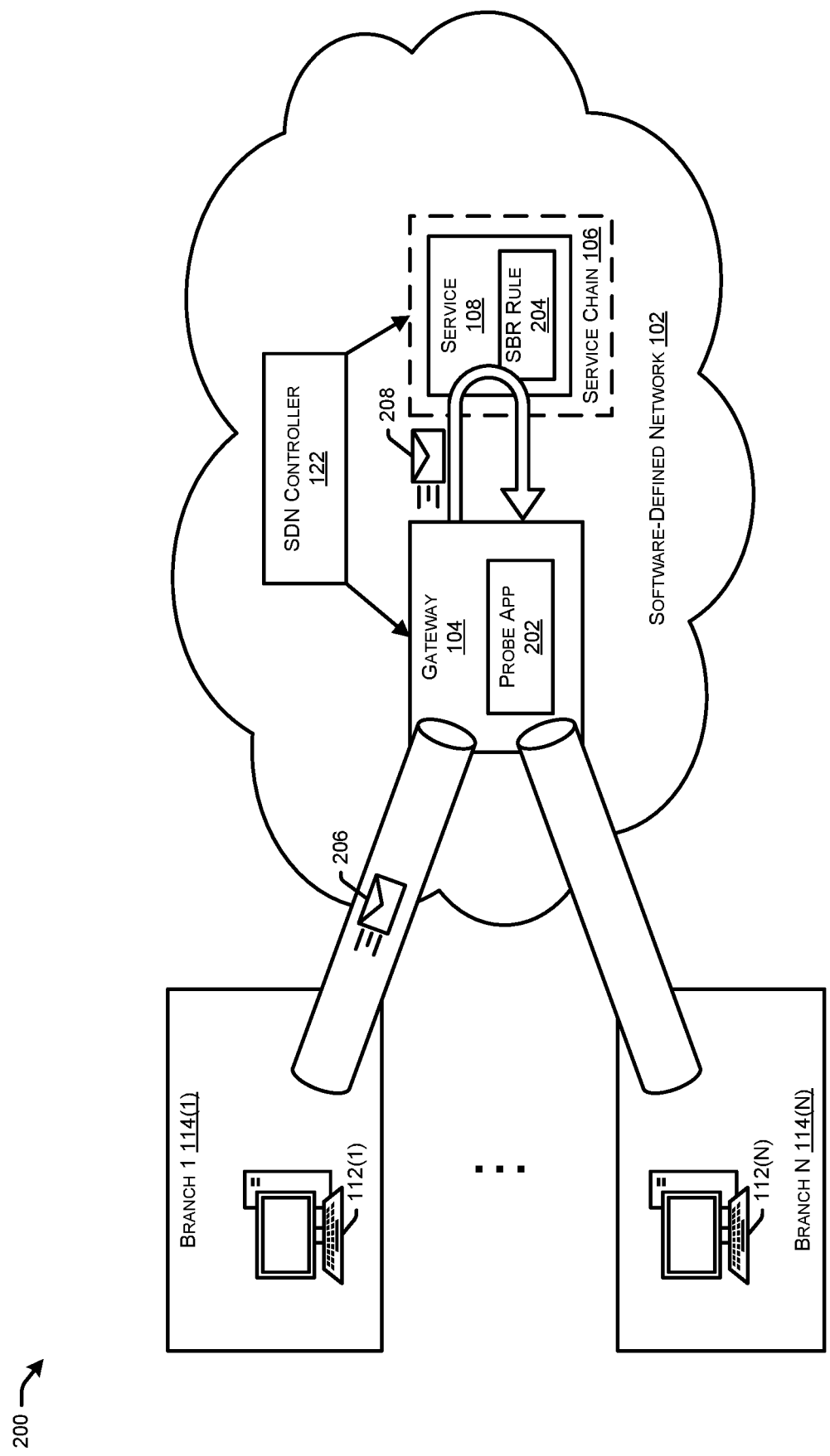
FIG. 2A illustrates a system-architecture diagram of an example environment for a network gateway to utilize a probe application to insert a security boundary rule in a security service and verify that the security service is functioning properly prior to redirecting network traffic to the security service.

As previously described, the network gateway 104 may be at least partially programmable, such that a user 126 (e.g., a network administrator, an enterprise user, a customer, etc.) may provide input data 130 specifying a port to open on a given network device hosting a given security service 108. Additionally, or alternatively, the network gateway 104 may have a default policy indicating a default port to open on a given network device hosting a given security service 108. In some examples, the same port may be utilized for each network device hosting a security service 108 included in a service chain 106. Additionally, or alternatively, a specific port may be utilized for each respective network device hosting a security service 108 included in the service chain 106. Turning to FIG. 2A, a port opened on the network device(s) hosting the security service(s) 108, a security boundary rule may be provisioned in the respective security service(s) 108.

FIG. 2A illustrates a system-architecture diagram of an example environment 200 for a network gateway 104 to utilize a probe application 202 to insert a security boundary rule 204 in a security service 108 and verify that the security service 108 is functioning properly prior to redirecting network traffic 206 to the security service 108. In some examples, the software-defined network 102, the network gateway 104, the service chain 106, the service 108 the computing device(s) 112, the branch(es) 114, the network controller 122 as described with respect to FIGS. 2A and 2B may correspond to the software-defined network 102, the network gateway 104, the service chain 106, the service 108 the computing device(s) 112, the branch(es) 114, the network controller 122 as described with respect to FIG. 1. In some examples, the probe app 202 may correspond to the container/port listener 124 as described with respect to FIG. 1.

A security boundary rule 204 may indicate a source (e.g., the probe app 202) at which test network traffic 208 may be sent from the network gateway 104 and to the security service 108 and/or a destination (e.g., the probe app 202) at which the test network traffic 208 will be received at the network gateway and from the security service. That is, the security boundary rule 204 may act as a U-turn with respect to the test network traffic 208 (as illustrated in FIG. 2A).

Figure 2B:
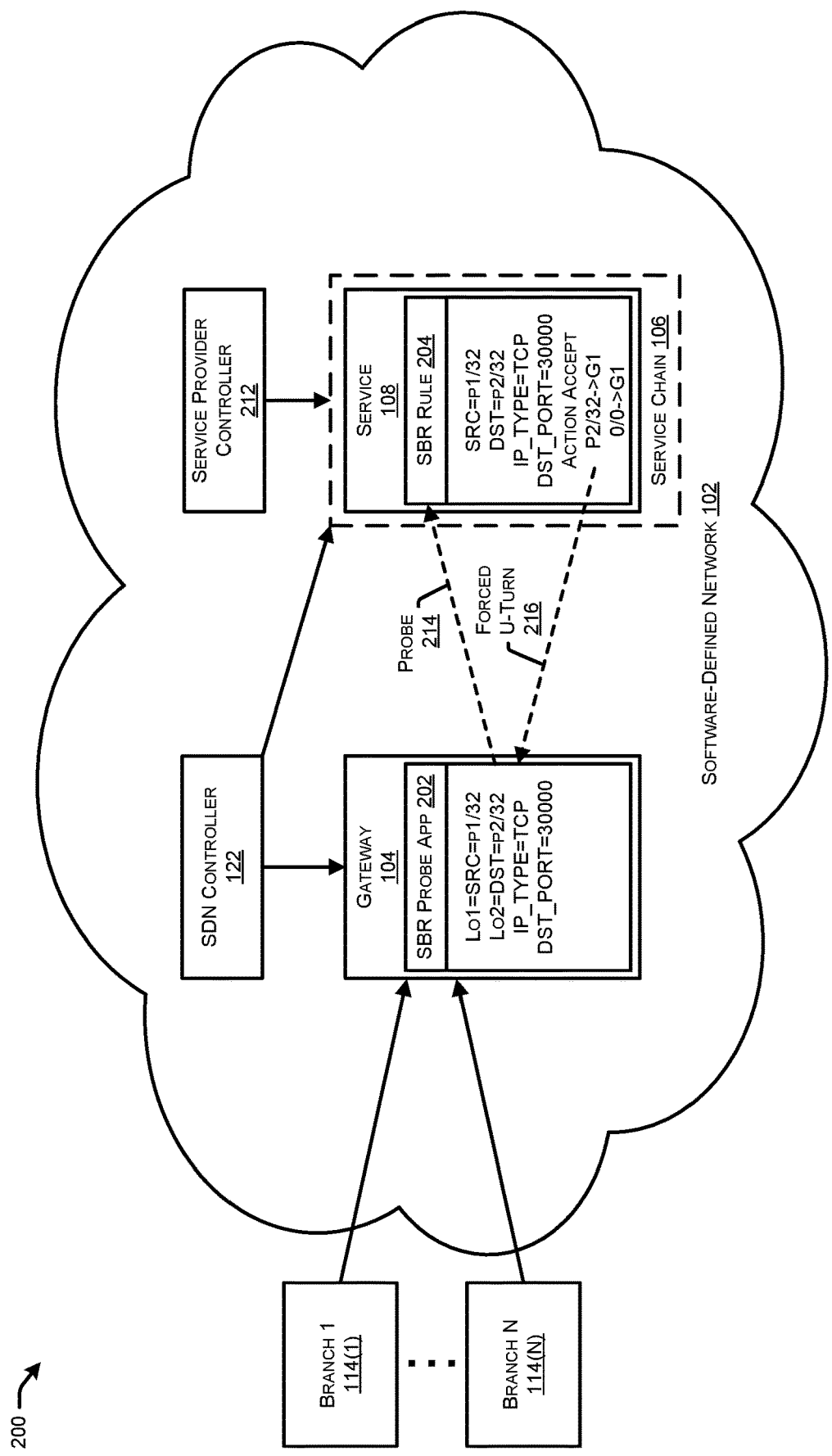
FIG. 2B illustrates a system-architecture diagram of another example environment for a network gateway to utilize a probe application to insert a security boundary rule in a security service and verify that the security service is functioning properly prior to redirecting network traffic to the security service.

As previously described, the network gateway 104 may comprise a security boundary rule probing application 202 configured to transmit the test network traffic 208. Turning to FIG. 2B, the network gateway 104 may execute containers, virtual machines, and/or the like to host virtual source(s) and/or virtual destination(s) (illustrated in FIG. 2B as the SBR probe app 202). In some examples, a service provider controller 212 associated with the service provider network 110 hosting the one or more security services 108 may be configured to transmit a default policy and/or the SBR rule 204 to the security service 108. For example, the network gateway 104 may be configured to execute a first container configured to host a virtual source (e.g., illustrated in FIG. 2B SBR probe app 202 as "Lo1=SRC=p1/32", where "Lo1" may represent the virtual source and "p1" may represent an enterprise prefix associated with the first branch 114(1)) on the network gateway 104 and/or a second container configured to host a virtual destination (e.g., illustrated in FIG. 2B SBR probe app 202 as "Lo2=DST=p2/32", where "Lo2" may represent the virtual destination and "p2" may represent an enterprise prefix associated with the second branch 114(N)) on the network gateway 104. The network gateway 104 may then utilize the first container hosting the virtual source to transmit the test network traffic 208 as a probe 214 to a network device hosting a security service 108 via the open port (e.g., illustrated in FIG. 2B SBR probe app 202 as "DST_PORT=30000"), where the test network traffic 208 may be sent through the security service 108 and/or processed by the security service 108. Additionally, or alternatively, the network gateway may utilize the second container hosting the virtual destination to receive the test network traffic 208 from the network device hosting the security service 108 via the open port, as illustrated by the forced U-Turn 216. When the test network traffic 208 is received at the virtual destination, the network gateway 104 may utilize the received test network traffic 208 to determine whether the security service 108 meets a functionality threshold and/or a health threshold.

Turning back to FIG. 1, by receiving the test network traffic 208 at the virtual destination (e.g., hosted by the container/port listener 124), the network gateway 104 may determine that the data-path is functioning correctly. In some examples, determining that the test network traffic 208 was successfully sent from the virtual source, positioned on a first side of the security service 108 along the data-path between the first computing device 112(1) and the second computing device 112(N), to the network device hosting the security service 108, and received at the virtual destination, may indicate that the data-path is functioning correctly (e.g., the network is not cut off by the network device hosting the security service 108). In such an example, the network gateway 104 may determine that the security service 108 satisfies a threshold level of functionality. Additionally, or alternatively, the network gateway 104 may make various determinations about the health of a security service 108 based on one or more performance metrics, such as, for example, a response time associated with the security service 108, packet latency associated with the security service 108, central processing unit (CPU) metrics associated with the security service 108, and/or the like. For example, if the returned test network traffic 208 indicates a slow response time, a high measure of packet latency, and/or CPU metrics indicative of high usage, the network gateway 104 may determine that the security service 108 does not satisfy the health threshold. Additionally, or alternatively, if the returned test network traffic 208 indicates a moderate to fast response time, a moderate to low measure of packet latency, and/or CPU metrics indicative of moderate to low usage, the network gateway 104 may determine that the security service 108 does not satisfy the health threshold.

The network gateway 104 may be further configured to utilize the indications of functionality and/or health associated with one or more security service(s) 108 of a service chain 106 to determine whether or not to redirect network traffic 206, along a data-path between the first computing device 112(1) and the second computing device 112(2), to the security service 108. For example, the network gateway 104 may determine that a given security service 108(1) in the service chain 106 satisfies a threshold level of functionality and/or health, and in response, the network gateway 104 may transmit configuration data associated with the network device hosting the security service 108(1) and/or the security service 108(1) to additional network devices in the software-defined network 102. The configuration data may cause network traffic 206 along the data-path between the first computing device 112(1) and the second computing device 112(N) to be redirected to the security service 108(1). In some examples, the network gateway 104 may transmit configuration data for each individual security service 108(1)-(N) included in the service chain 106. Additionally, or alternatively, the network gateway 104 may transmit configuration data for all of the security services 108 in the service chain 106.

The network gateway 104 may also be configured to utilize the open port on a network device hosting a security service 108 to test the functionality and/or health of the security service over time. For example, a security service 108(1) may be unresponsive or otherwise indicate unexpected behavior. In such an example, the network gateway 104 may attempt to send test network traffic 208 from the virtual source through the security service 108(1) and to the virtual destination to determine whether the security service 108(1) is functioning properly and/or is healthy. In examples where the security service 108(1) does not satisfy the threshold functionality and/or health, the network gateway 104 may transmit configuration data to the additional network devices in the software-defined network 102 causing network traffic 206 along the data-path between the first computing device 112(1) and the second computing device 112(N) to be redirected to a different network device hosting the same security service 108(1) (or a security service 108(2) providing substantially similar operations). Additionally, or alternatively, at a later time (e.g., following instruction from an admin, a lapsing of a period of time, etc.), the network gateway 104 may test the same security service 108(1) again and determine that the security service 108(1) satisfies the threshold functionality and/or health. In such an example, the network gateway 104 may transmit configuration data to the additional network devices in the software-defined network 102 causing the network traffic 206 along the data-path between the first computing device 112(1) and the second computing device 112(N) to be once again redirected to the original network device hosting the original security service 108(1). That is, the network gateway 104 may be configured to dynamically update the status of the network devices hosting the security services 108 with respect to the other network devices, and cause network traffic 206 to be redirected to the security services 108 when the functionality and/or health satisfies the thresholds.

While the examples provided herein with respect to FIG. 1-2B describe data-path(s) connecting separate branch(es) 114, it should be understood that the techniques described herein may be implemented on data-path(s) connecting separate branch(es) 114, one or more cloud workload(s) 118, and/or any other network enabled device and/or site. Additionally, or alternatively, the techniques described herein may be implemented on-premises (e.g., in an enterprise network) in hybrid networks, and/or the like, such that the network gateway and/or the service chain may be executing on-premises of a enterprise network and/or at a data center associated with the enterprise network and/or hybrid network.

Figure 3:
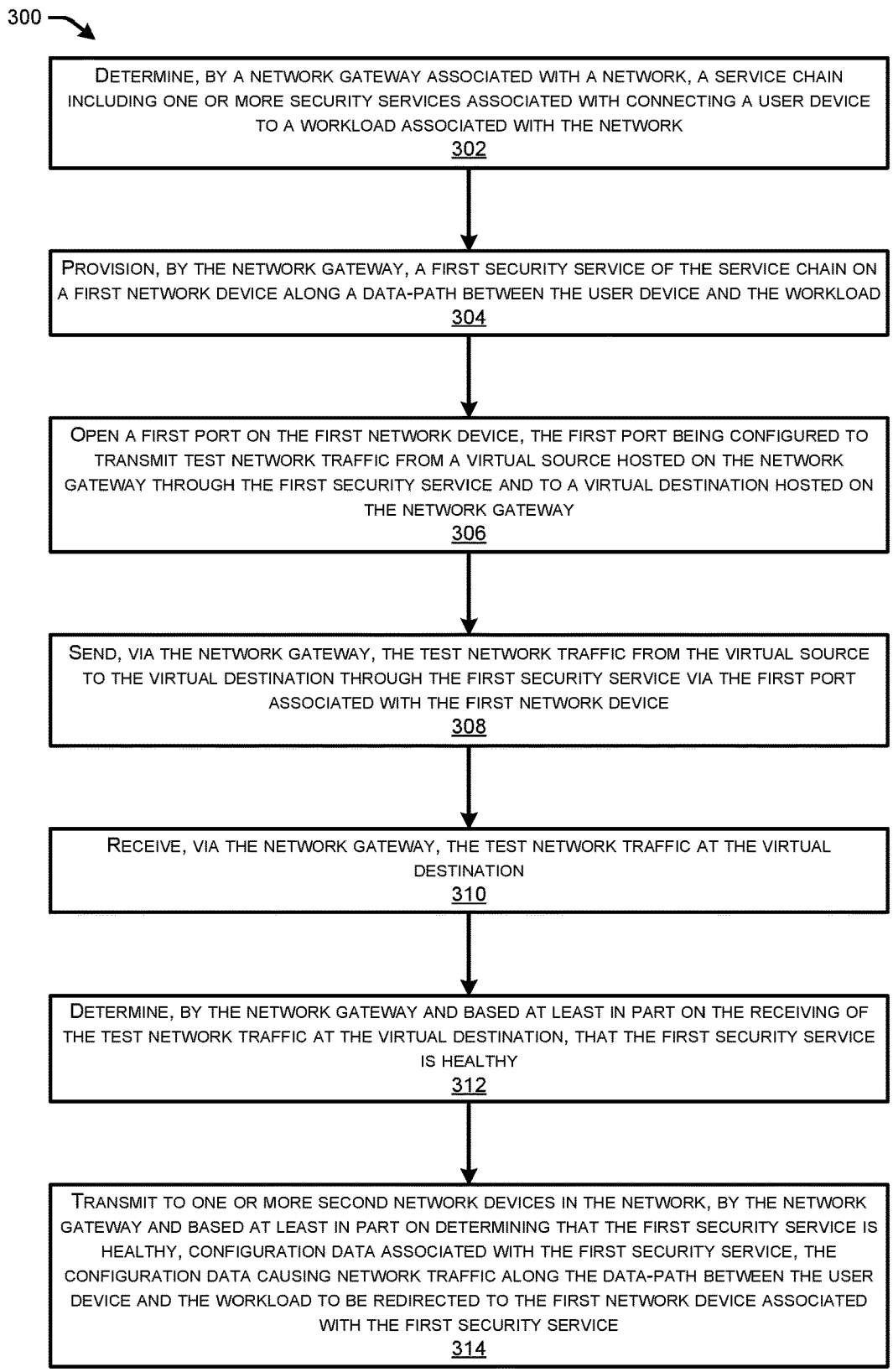
FIG. 3 illustrates a flow diagram of an example method for a network gateway to provision a security service along a data-path between a user device and a workload, determining that the security service is healthy based on sending test network traffic through the security service via a specified port, and redirecting network traffic toward the security service based on determining that the service is healthy.

FIG. 3 illustrates a flow diagram of an example method 300 that illustrates aspects of the functions performed at least partly by the software-defined network 102, the gateway 104, the services 108, the computing device(s) 112, the branch(es) 114, the SDN controller 122, and/or the container/port listener 124 as described in FIGS. 1-2B. The logical operations described herein with respect to FIG. 3 may be implemented (1) as a sequence of computer-implemented acts or program modules running on a computing system and/or (2) as interconnected machine logic circuits or circuit modules within the computing system. In some examples, the method 300 may be performed by a system comprising one or more processors and one or more non-transitory computer-readable media storing computer-executable instructions that, when executed by the one or more processors, cause the one or more processors to perform the method 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a network gateway to provision a security service along a data-path between a user device and a workload, determining that the security service is healthy based on sending test network traffic through the security service via a specified port, and redirecting network traffic toward the security service based on determining that the service is healthy. In some examples, the network, the network gateway, the security service, the user device, and/or the workload may correspond to the software-defined network 102, the network gateway 104, the security service(s) 108, the computing device(s) 112, and/or the cloud workload 118 as described with respect to FIG. 1.

At 302, the method 300 may include determining, by a network gateway associated with a network, a service chain including one or more security services associated with connecting a user device to a workload associated with the network. In some examples, the service chain may correspond to the service chain 106 as described with respect to FIG. 1.

At 304, the method 300 may include provisioning a first security service of the service chain on a first network device along a data-path between the user device and the workload. In some examples, the security service may be a security service offered by a service provider network and/or may be executing on a network device associated with the service provider network, such as, for example, the service provider network 110 as described with respect to FIG. 1.

At 306, the method 300 may include opening a first port on the first network device. In some examples, the first port may be configured to transmit test network traffic from a virtual source hosted on the network gateway through the first security service and/or to a virtual destination hosted on the network gateway. In some examples, the virtual source and/or the virtual destination may correspond to the container/port listener as described with respect to FIG. 1.

At 308, the method 300 may include sending, via the network gateway, the test network traffic from the virtual source to the virtual destination through the first security service via the first port associated with the first network device. In some examples, the test network traffic may be sent as the probe 214 as described with respect to FIG. 2B.

At 310, the method 300 may include receiving, via the network gateway, the test network traffic at the virtual destination. In some examples, the test network traffic may be received as a forced U-turn 216 as described with respect to FIG. 2B.

At 312, the method 300 may include determining, by the network gateway, that the first security service is healthy. In some examples, the network gateway may determine that the first security service is healthy based at least in part on the receiving of the test network traffic at the virtual destination.

At 314, the method 300 may include transmitting to one or more second network devices in the network, by the network gateway and based at least in part on determining that the first security service is healthy, configuration data associated with the first security service. In some examples, the configuration data may cause network traffic along the data-path between the user device and the workload to be redirected to the first network device associated with the first security service.

Additionally, or alternatively, the method 300 may include receiving, at the network gateway and from a computing device, user input representing an indication of the first port on the first network device. Additionally, or alternatively, the method 300 may include generating a policy associated with at least the first security service based at least in part on the user input. In some examples, the policy may indicate that the first port of the first network device is configured to transmit the test network traffic from the virtual source through the first security service and to the virtual destination. Additionally, or alternatively, opening the first port on the first network device may be based at least in part on the policy.

In some examples, the virtual source hosted on the network gateway may be positioned on a first side of first security service along the data-path between the user device and the workload. Additionally, or alternatively, the virtual destination hosted on the network gateway is positioned on a second side of the first security service along the data-path between the user device and the workload. In some examples, the second side may be opposite from the first side.

Additionally, or alternatively, the method 300 may include determining, based at least in part on receiving the test network traffic at the virtual destination, one or more performance metrics associated with the first security service. In some examples, the one or more performance metrics may comprise at least one of a response time associated with the first security service, packet latency associated with the first security service, central processing unit (CPU) metrics associated with the first security service, and/or the like. Additionally, or alternatively, the method 300 may include determining that the first security service is healthy based at least in part on the one or more performance metrics associated with the first security service.

Additionally, or alternatively, the method 300 may include executing, by the network gateway, a first container configured to host the virtual source on the network gateway. Additionally, or alternatively, the method 300 may include executing, by the network gateway, a second container configured to host the virtual destination on the network gateway. In some examples, the test network traffic may be sent from the first container to the second container through the first security service via the first port associated with the first network device.

In some examples, the first security service may comprise at least one of one or more firewalls, one or more intrusion detection systems (IDS), one or more intrusion prevention systems (IPS), one or more load balancers, and/or the like.

In some examples, the configuration data may be first configuration data. Additionally, or alternatively, the method 300 may include provisioning, by the network gateway, a second security service of the service chain on a third network device along the data-path between the user device and the workload. Additionally, or alternatively, the method 300 may include opening a second port on the third network device. In some examples, the second port may be configured to transmit the test network traffic from the network gateway through the second security service and back to the network gateway. Additionally, or alternatively, the method 300 may include determining, by the network gateway and based at least in part on forwarding the test network traffic to the third network device through the second port, that the second security service is healthy. Additionally, or alternatively, the method 300 may include transmitting to the one or more second network devices in the network, by the network gateway and based at least in part on determining that the second security service is healthy, second configuration data associated with the second security service. In some examples, the second configuration data may cause network traffic along the data-path between the user device and the workload to be redirected to the first network device associated with the first security service and the third network device associated with the second security service.

Figure 4:
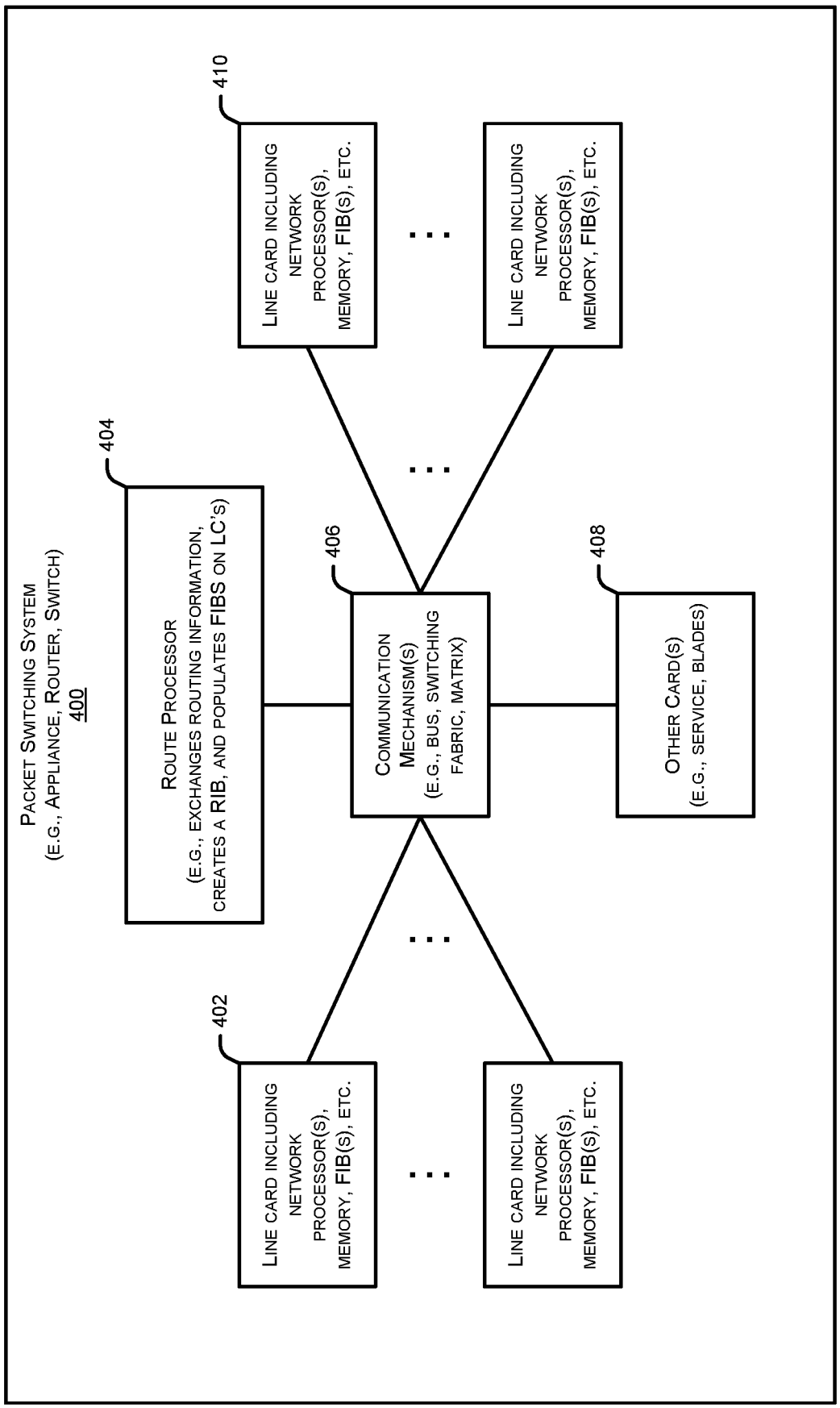
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, the software-defined network 102 as described with respect to FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements 405 for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
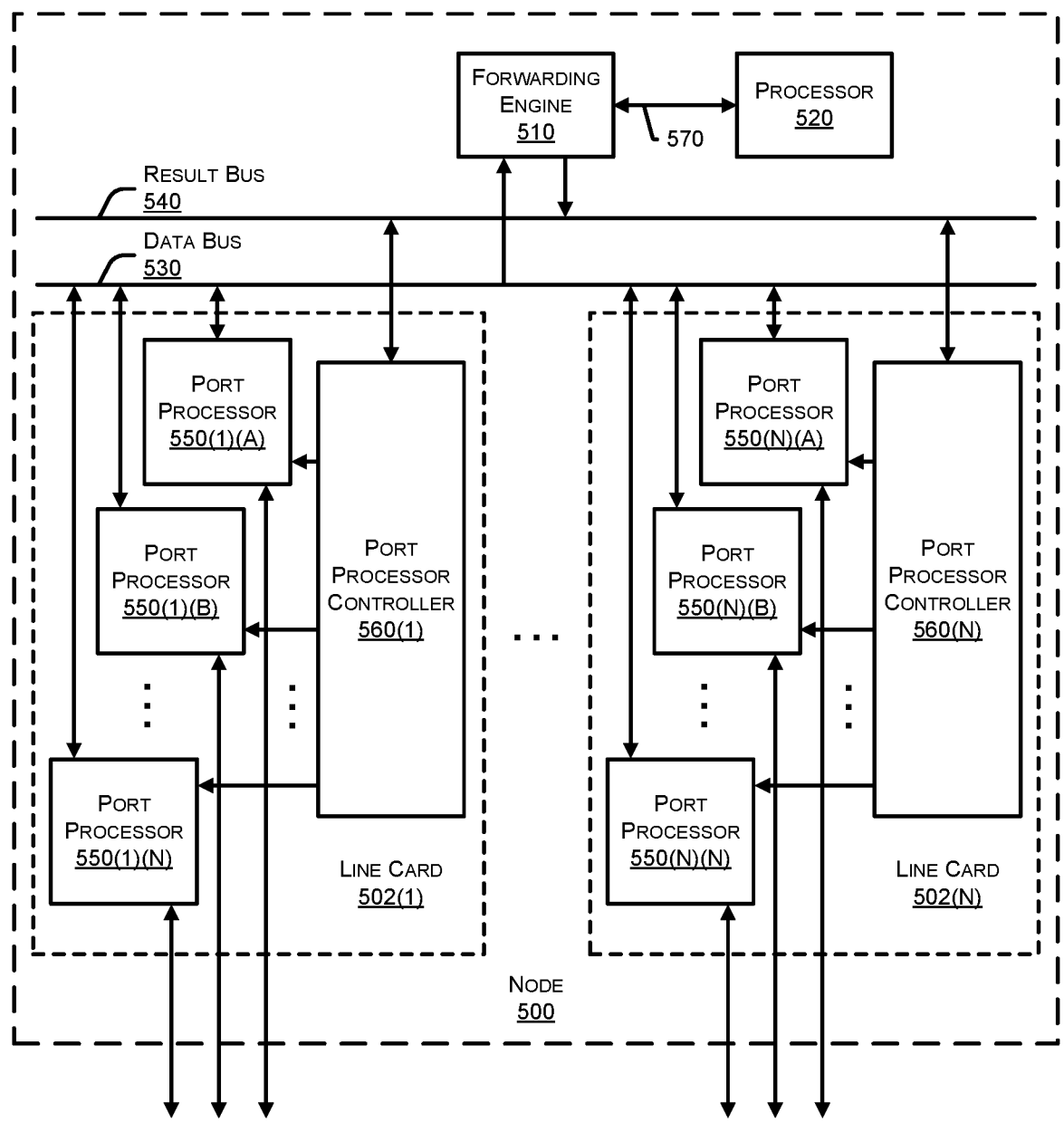
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, the software-defined network 102 as described with respect to FIG. 1.

In some examples, node 800 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 802(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 830 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560 (1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or maty add packet security information in order to secure the packet. On a node 500 sourcing such a packet or packet and header, this processing may include, for example, encryption of some or all of the packet's or packet and header's information, the addition of a digital signature, and/or some other information and/or processing capable of securing the packet or packet and header. On a node 500 receiving such a processed packet or packet and header, the corresponding process may be performed to recover or validate the packet's or packet and header's information that has been secured.

Figure 6:
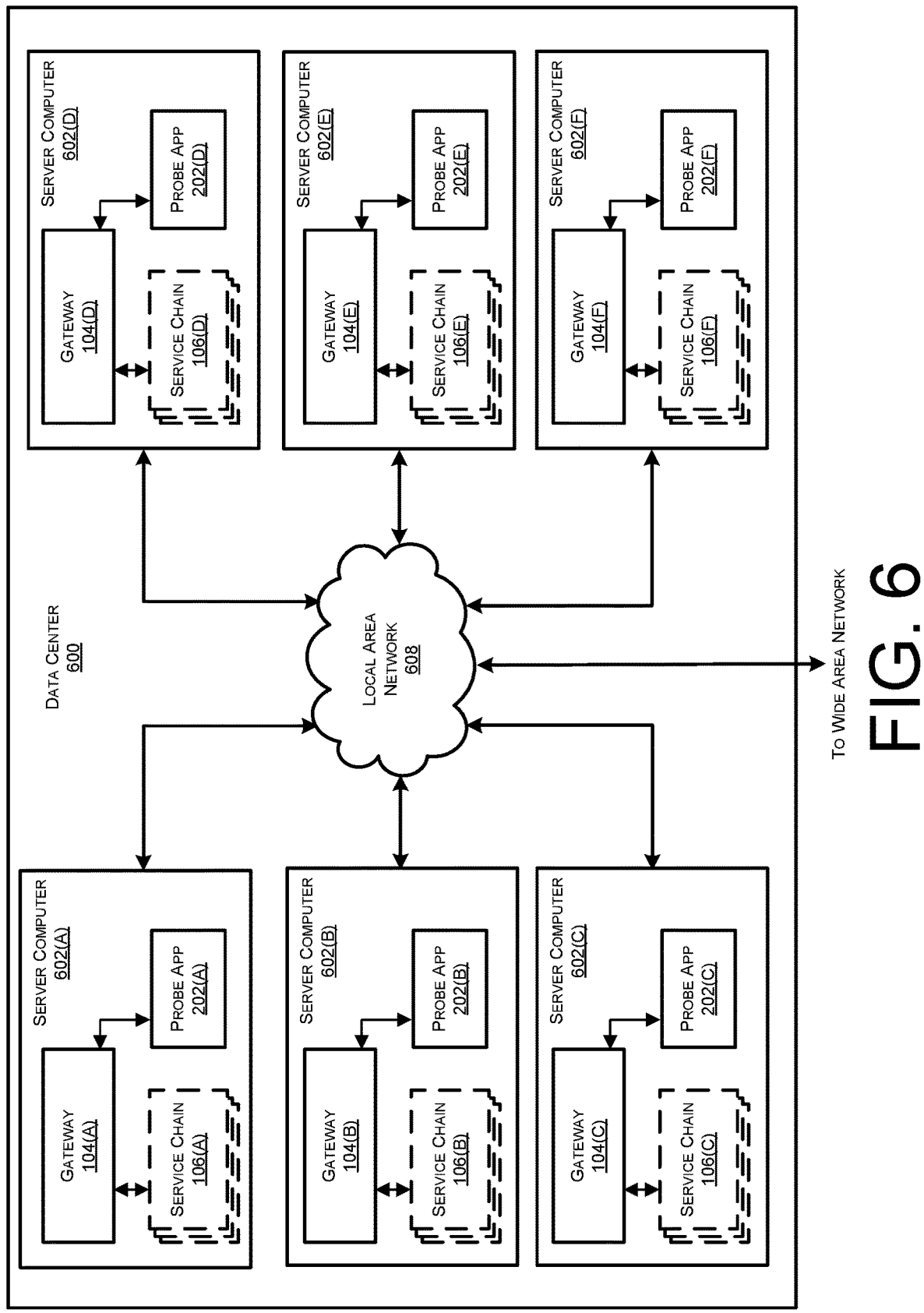
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the server computers 602 may include, or correspond to, the servers associated with the site (or data center) 104, the packet switching system 400, and/or the node 500 described herein with respect to FIGS. 1, 4 and 5, respectively.

The server computers 602 can be standard tower, rackmount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute a network gateway 104, one or more service(s) 108, and/or the SDN controller 122.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
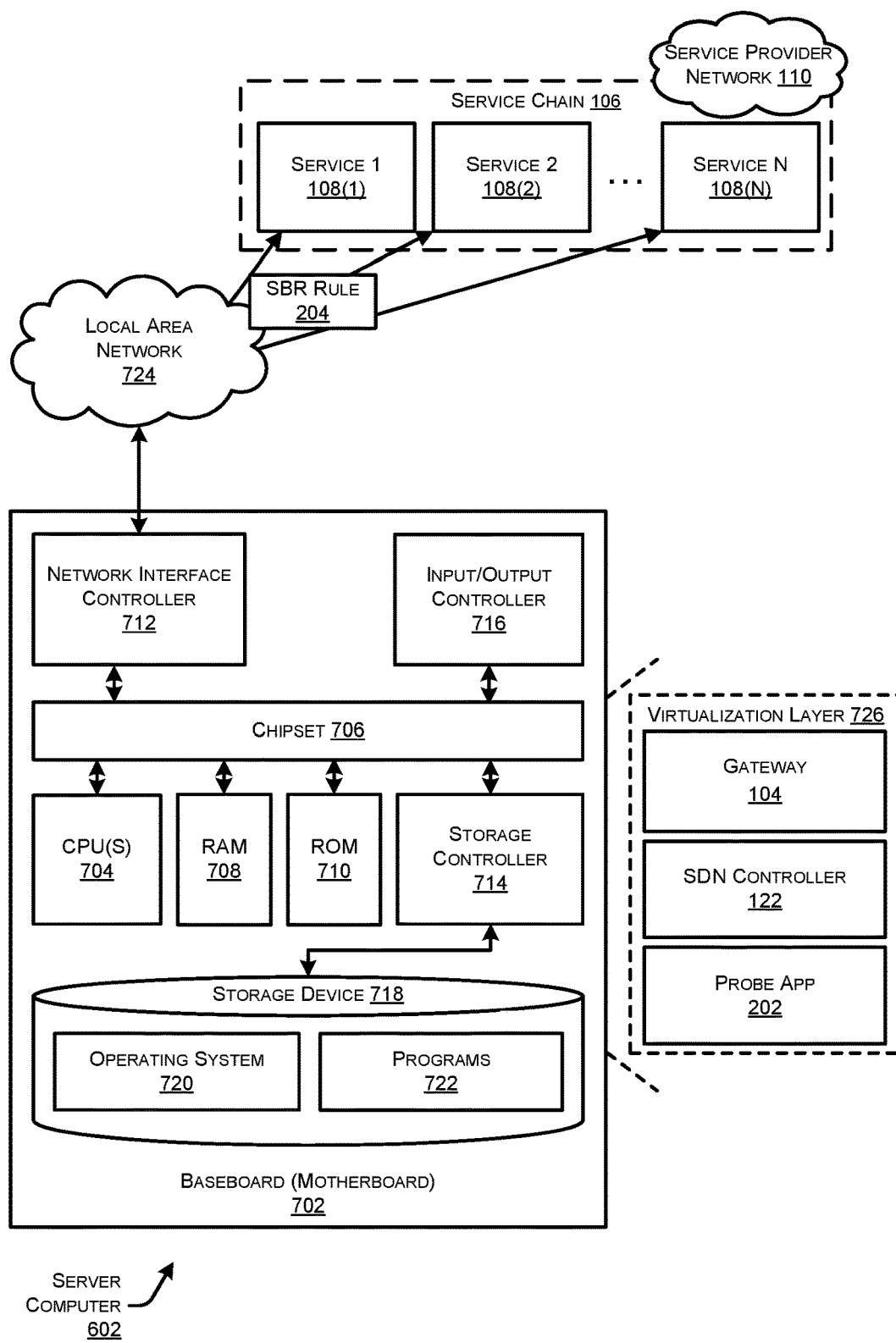
FIG. 7 is a computer architecture diagram showing an illustrative computer hardware architecture for implementing a server device that can be utilized to implement aspects of the various technologies presented herein.

FIG. 7 shows an example computer architecture for a computing device (or network routing device) 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 602 may, in some examples, correspond to a physical server of a data center, the packet switching system 400, and/or the node 500 described herein with respect to FIGS. 1, 4, and 5, respectively.

The computing device 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 602. The chipset 706 can further provide an interface to a computer-readable storage medium such as a read-only memory ("ROM") 710 or non-volatile RAM ("NVRAM") for storing basic routines that help to startup the computing device 602 and to transfer information between the various components and devices. The ROM 710 or NVRAM can also store other software components necessary for the operation of the computing device 602 in accordance with the configurations described herein.

The computing device 602 can operate in a networked environment using logical connections to remote computing devices and computer systems through a network, such as the network 724 (or 608). The chipset 706 can include functionality for providing network connectivity through a NIC 712, such as a gigabit Ethernet adapter. The NIC 712 is capable of connecting the computing device 602 to other computing devices over the network 724. It should be appreciated that multiple NICs 712 can be present in the computing device 602, connecting the computer to other types of networks and remote computer systems.

The computing device 602 can be connected to a storage device 618 that provides non-volatile storage for the computing device 602. The storage device 618 can store an operating system 720, programs 722, and data, which have been described in greater detail herein. The storage device 618 can be connected to the computing device 602 through a storage controller 714 connected to the chipset 706. The storage device 618 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 602 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 602 can store information to the storage device 618 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 602 can further read information from the storage device 618 by detecting the physical states or characteristics of one or more particular locations within the physical storage units.

In addition to the mass storage device 618 described above, the computing device 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 602. In some examples, the operations performed by the computing resource network 102, and or any components included therein, may be supported by one or more devices similar to computing device 602. Stated otherwise, some or all of the operations performed by the computing resource network 102, and or any components included therein, may be performed by one or more computing device 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 720 utilized to control the operation of the computing device 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 602.

In one embodiment, the storage device 618 or other computer-readable storage media is encoded with computer-executable instructions which, when loaded into the computing device 602, transform the computer from a general-purpose computing system into a special-purpose computer capable of implementing the embodiments described herein. These computer-executable instructions transform the computing device 602 by specifying how the CPUs 704 transition between states, as described above. According to one embodiment, the computing device 602 has access to computer-readable storage media storing computer-executable instructions which, when executed by the computing device 602, perform the various processes described above with regard to FIGS. 3-X. The computing device 602 can also include computer-readable storage media having instructions stored thereupon for performing any of the other computer-implemented operations described herein.

The computing device 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 602 might not include all of the components shown in FIG. 7, can include other components that are not explicitly shown in FIG. 7, or might utilize an architecture completely different than that shown in FIG. 7.

The server computer 602 may support a virtualization layer 726, such as one or more components associated with the software-defined network 102, such as, for example, the network gateway 104, the SDN controller 122, and/or the probe app 202 as described with respect to FIGS. 1-2B. In some examples, the network gateway 104 may be configured to open a port on one or more network devices hosting one or more security services 108 of a service chain 106 offered by a service provider network 110. Additionally, or alternatively, the network gateway 104, may be configured to send an SBR rule 204 to the security services 108, allowing for test network traffic to be sent to the security service(s) 108 via the port, from the probe app 202 of the network gateway 104 and back to the probe app 202 of the network gateway 104. The network gateway 104 may utilize the received test network traffic to determine whether the security service(s) 108 satisfy a threshold functionality and/or health measurement, and if the thresholds are satisfied, the network gateway 104 may send configuration data to additional network devices in the network causing network traffic along a given data-path to be redirected to the security service(s) 108.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining, by a network gateway associated with a network, a service chain including one or more security services associated with connecting a user device to a workload associated with the network;
   provisioning a first security service of the service chain on a first network device along a data-path between the user device and the workload;
   opening a first port on the first network device, the first port being configured to transmit test network traffic from a virtual source hosted on the network gateway through the first security service and to a virtual destination hosted on the network gateway;
   sending, via the network gateway, the test network traffic from the virtual source to the virtual destination through the first security service via the first port associated with the first network device;
   receiving, via the network gateway, the test network traffic at the virtual destination;
   determining, by the network gateway and based at least in part on the receiving of the test network traffic at the virtual destination, that the first security service is healthy; and
   transmitting to one or more second network devices in the network, by the network gateway and based at least in part on determining that the first security service is healthy, configuration data associated with the first security service, the configuration data causing network traffic along the data-path between the user device and the workload to be redirected to the first network device associated with the first security service.

2. The method of claim 1, further comprising:
   receiving, at the network gateway and from a computing device, user input representing an indication of the first port on the first network device; and
   generating a policy associated with at least the first security service based at least in part on the user input, the policy indicating that the first port of the first network device is configured to transmit the test network traffic from the virtual source through the first security service and to the virtual destination,
   wherein opening the first port on the first network device is based at least in part on the policy.

3. The method of claim 1, wherein:
   the virtual source hosted on the network gateway is positioned on a first side of first security service along the data-path between the user device and the workload; and
   the virtual destination hosted on the network gateway is positioned on a second side of the first security service along the data-path between the user device and the workload, the second side being opposite from the first side.

4. The method of claim 1, further comprising:
   determining, based at least in part on receiving the test network traffic at the virtual destination, one or more performance metrics associated with the first security service, the one or more performance metrics comprising at least one of:
   a response time associated with the first security service;
   packet latency associated with the first security service: or
   central processing unit (CPU) metrics associated with the first security service; and
   determining that the first security service is healthy based at least in part on the one or more performance metrics associated with the first security service.

5. The method of claim 1, further comprising:
   executing, by the network gateway, a first container configured to host the virtual source on the network gateway; and
   executing, by the network gateway, a second container configured to host the virtual destination on the network gateway,
   wherein the test network traffic is sent from the first container to the second container through the first security service via the first port associated with the first network device.

6. The method of claim 1, wherein the first security service comprises at least one of:
   one or more firewalls;
   one or more intrusion detection systems (IDS);
   one or more intrusion prevention systems (IPS); or
   one or more load balancers.

7. The method of claim 1, wherein the configuration data is first configuration data, and the method further comprising:
   provisioning, by the network gateway, a second security service of the service chain on a third network device along the data-path between the user device and the workload;

opening a second port on the third network device, the second port being configured to transmit the test network traffic from the network gateway through the second security service and back to the network gateway;

determining, by the network gateway and based at least in part on forwarding the test network traffic to the third network device through the second port, that the second security service is healthy; and transmitting to the one or more second network devices in the network, by the network gateway and based at least in part on determining that the second security service is healthy, second configuration data associated with the second security service, the second configuration data causing network traffic along the data-path between the user device and the workload to be redirected to the first network device associated with the first security service and the third network device associated with the second security service.

8. A system comprising:

one or more processors; and one or more computer-readable media storing computer-executable instructions that, when executed by the one or more processors, cause the one or more processors to perform operations comprising:

provisioning, by a network gateway associated with a network, a first security service on a first network device along a data-path between a source computing device and a destination computing device, the first security service being among one or more security services associated with establishing a connection between the source computing device and the destination computing device;

opening a first port on the first network device, the first port being configured to transmit test network traffic from the network gateway through the first security service and back to the network gateway;

determining, by the network gateway and based at least in part on forwarding the test network traffic to the first network device through the first port, that the first security service is healthy; and transmitting to one or more second network devices in the network, by the network gateway and based at least in part on determining that the first security service is healthy, configuration data associated with the first security service, the configuration data causing network traffic along the data-path between the source computing device and the destination computing device to be redirected to the first network device associated with the first security service.

9. The system of claim 8, the operations further comprising:

receiving, at the network gateway and from a computing device, user input representing an indication of the first port on the first network device; and generating a policy associated with at least the first security service based at least in part on the user input, the policy indicating that the first port of the first network device is configured to transmit the test network traffic through the first security service and back to the network gateway, wherein opening the first port on the first network device is based at least in part on the policy.

10. The system of claim 8, the operations further comprising:

executing, by the network gateway, a first container configured to host a virtual source on the network gateway;

executing, by the network gateway, a second container configured to host a virtual destination on the network gateway;

sending the test network traffic from the first container to the second container through the first security service via the first port associated with the first network device; and receiving the test network traffic at the second container and from the first network device.

11. The system of claim 10, wherein:

the virtual source hosted on the network gateway is positioned on a first side of first security service along the data-path between the source computing device and the destination computing device; and the virtual destination hosted on the network gateway is positioned on a second side of the first security service along the data-path between the source computing device and the destination computing device, the second side being opposite from the first side.

12. The system of claim 10, the operations further comprising:

determining, based at least in part on receiving the test network traffic at the virtual destination, one or more performance metrics associated with the first security service, the one or more performance metrics comprising at least one of:

a response time associated with the first security service;

packet latency associated with the first security service; or central processing unit (CPU) metrics associated with the first security service; and determining that the first security service is healthy based at least in part on the one or more performance metrics associated with the first security service.

13. The system of claim 8, wherein the first security service comprises at least one of:

one or more firewalls;

one or more intrusion detection systems (IDS);

one or more intrusion prevention systems (IPS): or one or more load balancers.

14. The system of claim 8, wherein the configuration data is first configuration data, and the operations further comprising:

provisioning, by the network gateway, a second security service of the one or more security services on a third network device along the data-path between the source computing device and the destination computing device;

opening a second port on the third network device, the second port being configured to transmit the test network traffic from the network gateway through the second security service and back to the network gateway;

determining, by the network gateway and based at least in part on forwarding the test network traffic to the third network device through the second port, that the second security service is healthy; and transmitting to the one or more second network devices in the network, by the network gateway and based at least in part on determining that the second security service is healthy, second configuration data associated with the second security service, the second configuration data causing network traffic along the data-path between the source computing device and the destination computing device to be redirected to the first network device associated with the first security service and the third network device associated with the second security service.

15. A method comprising:

provisioning, by a network gateway associated with a network, a first security service on a first network device along a data-path between a source computing device and a destination computing device, the first security service being among one or more security services associated with establishing a connection between the source computing device and the destination computing device;

opening a first port on the first network device, the first port being configured to transmit test network traffic from the network gateway through the first security service and back to the network gateway;

determining, by the network gateway and based at least in part on forwarding the test network traffic to the first network device through the first port, that the first security service is healthy; and transmitting to one or more second network devices in the network, by the network gateway and based at least in part on determining that the first security service is healthy, configuration data associated with the first security service, the configuration data causing network traffic along the data-path between the source computing device and the destination computing device to be redirected to the first network device associated with the first security service.

16. The method of claim 15, further comprising:

receiving, at the network gateway and from a computing device, user input representing an indication of the first port on the first network device; and generating a policy associated with at least the first security service based at least in part on the user input, the policy indicating that the first port of the first network device is configured to transmit the test network traffic through the first security service and back to the network gateway, wherein opening the first port on the first network device is based at least in part on the policy.

17. The method of claim 15, further comprising:

executing, by the network gateway, a first container configured to host a virtual source on the network gateway;

executing, by the network gateway, a second container configured to host a virtual destination on the network gateway;

sending the test network traffic from the first container to the second container through the first security service via the first port associated with the first network device; and receiving the test network traffic at the second container and from the first network device.

18. The method of claim 17, further comprising:

the virtual source hosted on the network gateway is positioned on a first side of first security service along the data-path between the source computing device and the destination computing device; and the virtual destination hosted on the network gateway is positioned on a second side of the first security service along the data-path between the source computing device and the destination computing device, the second side being opposite from the first side.

19. The method of claim 17, further comprising:

determining, based at least in part on receiving the test network traffic at the virtual destination, one or more performance metrics associated with the first security service, the one or more performance metrics comprising at least one of:

a response time associated with the first security service;

packet latency associated with the first security service; or central processing unit (CPU) metrics associated with the first security service; and determining that the first security service is healthy based at least in part on the one or more performance metrics associated with the first security service.

20. The method of claim 15, wherein the first security service comprises at least one of:

one or more firewalls;

one or more intrusion detection systems (IDS);

one or more intrusion prevention systems (IPS); or one or more load balancers.

\* \* \* \* \*